United States Patent
Dirksen et al.

(10) Patent No.: US 12,132,626 B1
(45) Date of Patent: Oct. 29, 2024

(54) AUTOMATED PERFORMANCE RETRIEVAL AND AUTOMATED PERFORMANCE REMEDIATION AND INCIDENT RESOLUTION

(71) Applicant: T-Mobile Innovations LLC, Overland Park, KS (US)

(72) Inventors: Jamir A. Dirksen, Casselberry, FL (US); Chris Poirier, Titusville, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/477,304

(22) Filed: Sep. 28, 2023

(51) Int. Cl.
*H04L 43/062* (2022.01)
*H04L 43/067* (2022.01)
*H04L 43/16* (2022.01)

(52) U.S. Cl.
CPC .......... *H04L 43/062* (2013.01); *H04L 43/067* (2013.01); *H04L 43/16* (2013.01)

(58) Field of Classification Search
CPC ...... H04L 43/062; H04L 43/067; H04L 43/16
USPC ........................................................ 709/224
See application file for complete search history.

(56) References Cited

U.S. PATENT DOCUMENTS

| | | |
|---|---|---|
| 9,753,800 B1 * | 9/2017 | Jadunandan ........ H04L 41/5074 |
| 2018/0220312 A1 * | 8/2018 | Guttenfelder ........... G01S 19/23 |
| 2019/0150150 A1 * | 5/2019 | Calin ................ H04W 72/0453 |
| | | 370/329 |
| 2020/0382361 A1 * | 12/2020 | Chandrasekhar ...... G06N 3/044 |
| 2020/0396120 A1 * | 12/2020 | Guilbeault .......... H04L 41/0672 |
| 2023/0300039 A1 * | 9/2023 | Kersch ................ H04L 41/5074 |
| | | 709/224 |
| 2024/0171486 A1 * | 5/2024 | Wubete ................ H04L 41/147 |

\* cited by examiner

*Primary Examiner* — Karen C Tang

(57) ABSTRACT

A method for automated retrieval of performance data and incident resolution based on an incident report in a telecommunications carrier network comprising a radio access network. The incident report is delayed relative to the retrieved performance data, and the method includes receiving an incident report based on first data associated with a first cell site, where the first data is associated with a first time; querying the first cell site for performance data of the first cell site responsive to the incident report; receiving performance data from the first cell site responsive to the query, where the performance data is associated with a second time that is later than the first time; and implementing a control response at the first cell site responsive to the received performance data, where the control response is to resolve an incident indicated by the incident report.

17 Claims, 6 Drawing Sheets

AUTOMATED PERFORMANCE RETRIEVAL AND AUTOMATED PERFORMANCE REMEDIATION AND INCIDENT RESOLUTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication network operators build systems and tools to monitor their networks, to identify network elements (NEs) that need maintenance, to assign maintenance tasks to personnel, and to fix network elements. Operational support systems (OSSs) may be provided by vendors of NEs to monitor and maintain their products. When trouble occurs in NEs, the OSS and/or the NEs may generate an alarm. An incident reporting system may be provided by the network operator to track incident reports which may be assigned to employees to resolve one or more pending alarms. It is understood that operating and maintaining a nationwide communication network comprising tens of thousands of cell sites and other NEs is very complicated.

SUMMARY

In an embodiment, a method for automated retrieval of performance data and incident resolution based on an incident report is disclosed. The incident report is delayed relative to the retrieved performance data, and the method is implemented in a telecommunications carrier network comprising a radio access network. The method includes receiving, by a performance retrieval and incident resolution application executing on a computer system in the telecommunications carrier network, an incident report based on first data associated with a first cell site, where the first data is associated with a first time; querying, by the performance retrieval and incident resolution application, the first cell site for performance data of the first cell site responsive to the incident report; receiving, by the performance retrieval and incident resolution application, performance data from the first cell site responsive to the query, where the performance data is associated with a second time that is later than the first time; and implementing a control response at the first cell site responsive to the received performance data, where the control response is to resolve an incident indicated by the incident report.

In another embodiment, a telecommunication network management system is disclosed. The telecommunication network management system is implemented in a telecommunications carrier network comprising a radio access network and comprises a performance retrieval application executing on a first computer system, and an incident resolution application that executes on a second computer system. The performance retrieval application is configured to receive an incident report based on first data associated with a first cell site, where the first data is associated with a first time query; the first cell site for performance data of the first cell site responsive to the incident report; and receive performance data from the first cell site responsive to the query, where the performance data is associated with a second time that is later than the first time. The incident resolution application is configured to implement a control response at the first cell site responsive to the received performance data, where the control response is to resolve an incident indicated by the incident report.

In yet another embodiment, a method for automated retrieval of performance data and incident resolution based on an incident report is disclosed. The incident report is delayed relative to the retrieved performance data, and the method is implemented in a telecommunications carrier network comprising a radio access network. The method comprises querying, by a performance retrieval and incident resolution application executing on a computer system in the telecommunications carrier network, a first cell site for performance data of the first cell site responsive to an incident report from the first cell site; receiving, by the performance retrieval and incident resolution application, performance data from the first cell site via a second communication path responsive to the query, where the incident report is received via a first communication path that is independent of the second communication path; and implementing a control response at the first cell site responsive to the received performance data. The control response includes resetting, by the performance retrieval and incident resolution application, a first subset of network elements of the first cell site; receiving, by the performance retrieval and incident resolution application, second performance data from the first cell site, where the second performance data is associated with a third time that is later than the second time; determining, by the performance retrieval and incident resolution application, whether the second performance data indicates that the incident of the first cell site is resolved; and clearing the incident report responsive to the second performance data indicating that that the incident of the first cell site is resolved.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
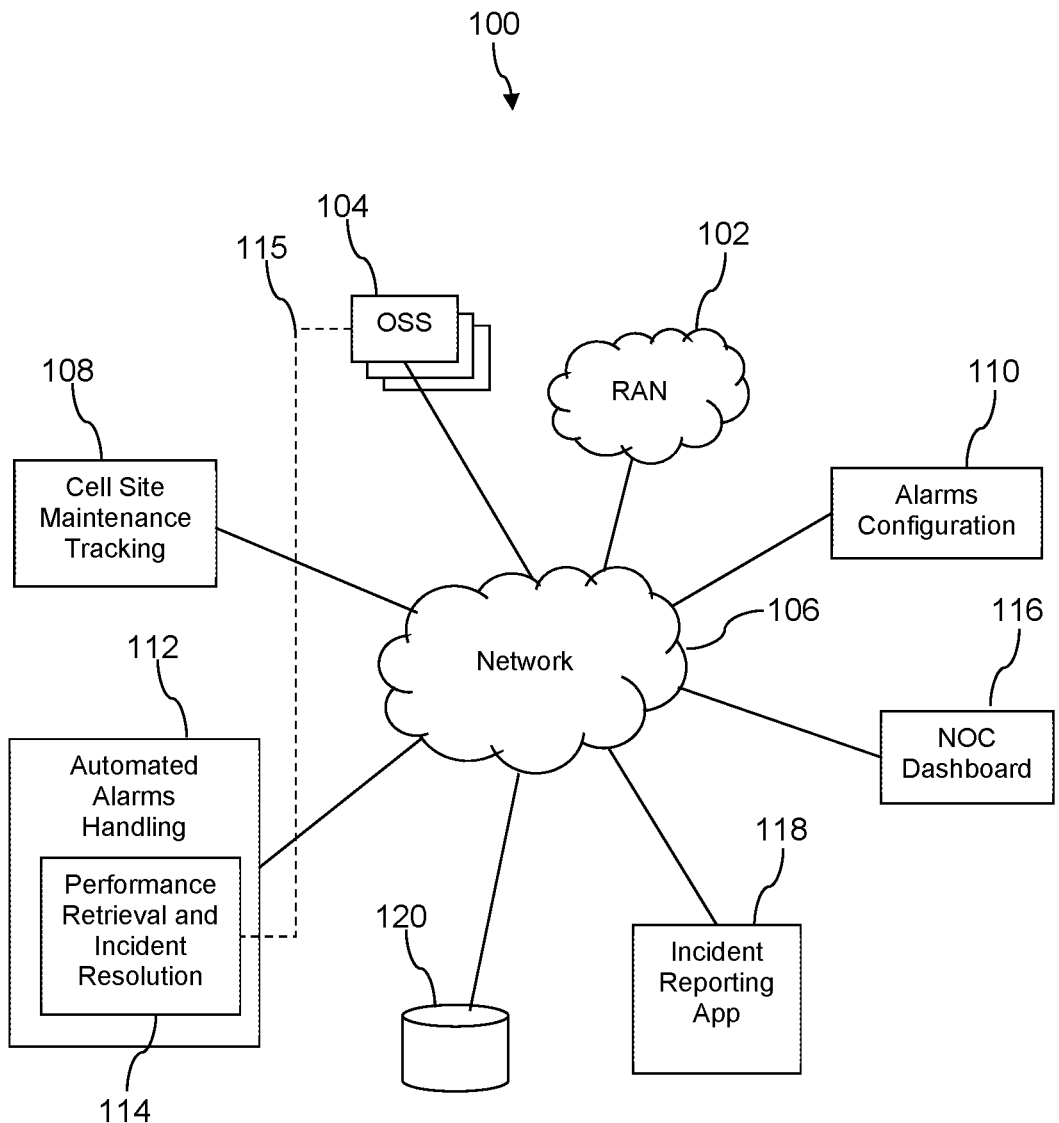
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network elements (NEs) in a radio access network (RAN) may include cellular sites (or "cell" sites) as well as other communication network nodes, such as routers and/or gateways. The actual physical functioning and operability of the NEs within a particular region may be managed by a central monitoring system, such as a network operations center (NOC), of a telecommunications service providing company. For example, each of the NEs in the region may be subject to a variety of faults or failures, which result in raising of alarms which are picked up by OSSs. The alarms may be propagated upwards to the central monitoring station (e.g., as an incident report), and personnel at the central monitoring system may automatically or manually generate an incident report detailing an outage that caused the alarm. In general, an alarm may be generated when a cell site is either unreachable or operating below capacity (e.g., below a minimum bandwidth or throughput level). For example, a cell site may occasionally go "sleepy", which describes a condition in which the cell site is servicing an amount of network traffic that is less than a predetermined threshold. The predetermined threshold may be a percentage of an expected traffic load (e.g., 70% of a normal traffic volume). A sleepy cell site may be caused by one or more NEs of the cell site performing sub-optimally, which may be remediated by resetting the underperforming NEs, or by otherwise resetting the cell site as a whole.

However, a duration between the onset of the alarm-generating incident (e.g., the cell site going sleepy) and the incident report being received at the NOC may be on the order of 60-90 minutes or more. This delay may be due to a number of factors, including the amount of time needed to properly collect alarm data from the cell site, to filter and/or store such data from the cell site, and to provide the data from the cell site in a user-friendly fashion (e.g., in a reporting style that is easily understood by human operators at the NOC). The delay may also be due in part to the fact that monitoring of cell sites is not necessarily performed in real-time, but rather in a batch-type fashion, where cell sites only typically report data on relatively coarse intervals, such as once every 15 minutes or the like.

Irrespective of the particular reason(s) for the delay between incident onset at the cell site and the NOC receiving a related incident report, such delay makes it more difficult for NOC operators to adequately resolve the incident. For example, a NOC operator may only realize that an incident has occurred at the cell site 90 minutes after incident onset (e.g., due to the above-mentioned delay), at which point the incident may already have been resolved, which the NOC operator would be unaware of. That is, by the time the incident is analyzed by the NOC operator, it may be out-of-date. Also, a corresponding delay would exist for the NOC operator to verify whether their incident resolution response has been effective. That is, the NOC operator would need to wait another 90 minutes for data from the cell site to confirm whether the incident has been resolved.

In this way, the delay in incident reporting to the NOC may result in misguided attempts and/or a waste of operator resources to resolve the underlying root cause. The delay in incident reporting to the NOC may also result in decreased network capacity and customer experience caused by the sleepy (or otherwise underperforming) cell site, and an increase in the consumption of network, power, and computing resources to work around the unresolved cell site issues in the system.

The present disclosure teaches a technical solution to the foregoing technical problem related to network operations and maintenance, which bypasses the above-described incident report communication path to query and receive more up-to-date performance data from a different, more direct communication path to the cell site in question. The more up-to-date performance data from the cell site may indicate whether the root cause that led to the incident report is still ongoing, or has already been resolved, which may further inform the behavior of the NOC operator(s) and/or an automated control response implemented by a NOC computing system. For example, if the performance data indicates that the underlying root cause has already been resolved, then NOC operator time and/or resources are saved by not commencing resolution actions based on the out-of-date incident report. On the other hand, if the performance data indicates that the underlying root cause persists, then the NOC operator (and/or NOC computing system) may implement a control response and confirm its effectiveness more quickly thereafter, such as by again querying and receiving performance data via the more direct communication path to the cell site.

In an embodiment, a performance retrieval and incident resolution application executing on a computer system may receive an incident report based on an alarm (e.g., first data) associated with a first cell site. The incident report may indicate that an amount of network traffic serviced by the first cell site is less than a predefined threshold; in other words, that the first cell site has gone "sleepy". For example, the predetermined threshold may be a percentage of an expected traffic load for the first cell site. As described above, by the time the incident report is received at the NOC, 60-90 minutes or more may have elapsed from the onset of the underlying alarm-generating incident (e.g., the first cell site going "sleepy"), which may be referred to as a first time for reference. The cause of this delay may be that the incident report is received via a first communication path, which includes a certain amount of information processing overhead, such as properly collecting alarm data from the first cell site, filtering and/or storing such data from the first cell site, and providing the data from the first cell site in a user-friendly fashion (e.g., in a reporting style that is easily understood by human operators at the NOC). The first communication path may also include inherent delay because monitoring of cell sites is not necessarily performed in real-time, but rather in a batch-type fashion, where cell sites only typically report data on relatively coarse intervals, such as once every 15 minutes or the like.

In response to receiving the incident report, the performance retrieval and incident resolution application queries the first cell site for performance data of the first cell site. As explained above, the incident report is based on data that is relatively delayed, and thus not necessarily indicative of a current status of the first cell site. In order to more directly query the first cell site for its performance data (e.g., more up-to-date data than that which the incident report is based upon), the performance retrieval and incident resolution application may determine an OSS that is associated with the first cell site. For example, a table may be maintained in a data repository that associates each cell site in a region, or in the communications network, with a particular OSS. In this example, the performance retrieval and incident resolution application determines the OSS associated with the first site based on the association contained in the table.

Then, once the OSS that is associated with the first cell site is determined, the performance retrieval and incident resolution application establishes a secure direct connection (e.g., using secure shell protocol (SSH)) with the OSS in order to query the first cell site for its more up-to-date performance data.

As a result, the performance retrieval and incident resolution application may receive the up-to-date performance data from the first cell site in a more direct fashion, such as directly from the OSS associated with the first cell site. Thus, a second communication path, which is independent of the first communication path, is provided between the performance retrieval and incident resolution application (e.g., executed on a NOC computer system) and the OSS associated with the first cell site. Accordingly, the received performance data is associated with a second time, which is later than the first time (i.e., the time at which the onset of the underlying alarm-generating incident occurred), and is more up-to-date than the first data of the incident report. For example, while the first data upon which the incident report is based may be 60-90 minutes old (or more), the queried performance data may be 15 minutes old, 10 minutes old, 5 minutes old, or less. This enables the performance retrieval and incident resolution application to more accurately determine whether the root cause that led to the incident report is still ongoing, or has already been resolved. Then, in turn, a control response for the first cell site may be more appropriately tailored, regardless of whether implemented by the NOC operator(s), an automated control response implemented by the NOC computing system, or a combination thereof. In one example, if the performance data indicates that the underlying root cause has already been resolved, then NOC operator time and/or resources are saved by not commencing resolution actions based on the out-of-date incident report.

In another example, in which the performance data indicates that the underlying root cause of the incident report persists, then a control response may be implemented (and its effectiveness confirmed more quickly, using the second communication path described above). As above, the control response may be implemented by the NOC operator(s), an automated control response implemented by the NOC computing system, or a combination thereof. For example, the performance retrieval and incident resolution application, executing on the NOC computing system, may also implement a control response at the first cell site responsive to the received performance data. The control response may be automated (e.g., implemented without human interaction), or may be under the control of a NOC operator, or a combination thereof. The control response may generally take various forms of intervention(s) meant to resolve the incident indicated by the incident report (e.g., the underlying root cause that generated the alarm upon which the incident report is based).

For example, the control response may be an automated cell site recovery routine, which may include a number of predetermined steps or actions to take that may result in returning the cell site to a normal performance state. The predetermined steps or actions may be performed in parallel, sequentially, or a combination of certain steps performed in parallel and other steps performed sequentially. In a first example, the control response includes resetting a first subset of NE(s) at the first cell site. Thereafter, the performance retrieval and incident resolution application receives second performance data from the first cell site (e.g., associated with a third time after the second time) and determines whether the control response is effective, such as whether resetting the first subset of NE(s) has resolved the incident. If the second performance data indicates that the incident is resolved, the performance retrieval and incident resolution application may clear the associated incident report.

However, if the second performance data indicates that the incident is not resolved, the performance retrieval and incident resolution application may implement a more intrusive control response, such as resetting a second subset of NE(s) at the first cell site, which is larger in scope than the first subset of NE(s). In other words, the initial control response may be less intrusive, in an attempt to resolve the incident with a reduced impact on the first cell site functionality. However, if the initial control response is not successful (e.g., as indicated by the queried second performance data), then a subsequent, more intrusive control response is undertaken. The performance retrieval and incident resolution application may also receive third performance data from the first cell site after resetting the second subset of NE(s) (e.g., associated with a fourth time after the third time) and determines whether the additional control response is effective, or whether resetting the second subset of NE(s) has resolved the incident. The second and third performance data may be retrieved via the second communication path, and thus also represent up-to-date information regarding the performance of the first cell site. If the third performance data indicates that the incident is resolved, the performance retrieval and incident resolution application may clear the associated incident report.

In a second example, the control response may include locking and unlocking of the cell site. In this context, "locking" may refer to placing the cell site (or NE(s) thereof) into a reduced functionality state, such as a state that may commonly be used for maintenance or other troubleshooting operations, while "unlocking" may refer to placing the cell site (or NE(s) thereof) back into their normal operating state. For example, locking a cell site pauses all traffic and effectively takes the cell site off line without necessarily resetting hardware (e.g., NE(s)) of the cell site. In some scenarios, locking and unlocking a cell site may restore traffic and remedy various issues at the cell site. Thereafter, the performance retrieval and incident resolution application receives the second performance data from the first cell site (e.g., associated with a third time after the second time) and determines whether the control response is effective, such as whether locking and unlocking the cell site has resolved the incident. If the second performance data indicates that the incident is resolved, the performance retrieval and incident resolution application may clear the associated incident report.

However, if the second performance data indicates that the incident is not resolved, the performance retrieval and incident resolution application may implement a more intrusive control response, such as locking a radio unit of the first cell site, resetting the radio unit, and then unlocking the radio unit. In other words, the initial control response may be less intrusive, in an attempt to resolve the incident with a reduced impact on the first cell site functionality. However, if the initial control response is not successful (e.g., as indicated by the queried second performance data), then a subsequent, more intrusive control response is undertaken. The performance retrieval and incident resolution application may also receive third performance data from the first cell site after performing the lock-reset-unlock of the radio unit (e.g., associated with a fourth time after the third time) and determines whether the additional control response is effective, or whether the lock-reset-unlock of the radio unit has resolved the incident. If the third performance data indicates that the incident is resolved, the performance retrieval and incident resolution application may clear the associated incident report.

However, if the third performance data indicates that the incident is not resolved, the performance retrieval and incident resolution application may implement a still more intrusive control response, such as locking a base band unit of the first cell site, resetting the base band unit, and then unlocking the base band unit. In other words, this third control response may be more intrusive than the initial and previous control responses, which were not successful in resolving the incident. The performance retrieval and incident resolution application may also receive fourth performance data from the first cell site after performing the lock-reset-unlock of the base band unit (e.g., associated with a fifth time after the fourth time) and determines whether the additional control response is effective, or whether the lock-reset-unlock of the base band unit has resolved the incident. The second, third, and fourth performance data may be retrieved via the second communication path, and thus also represent up-to-date information regarding the performance of the first cell site. If the fourth performance data indicates that the incident is resolved, the performance retrieval and incident resolution application may clear the associated incident report.

The incident report may include identification data identifying the root cause corresponding to the alarm that resulted in the incident report being generated in the communication system. For example, the data identifying the root cause may be an identification or address of one or more NEs that have caused the cell site to go sleepy (or an address in the RAN at which an outage has occurred). A performance retrieval and incident resolution application may obtain this identification data from the incident report. This data may additionally or alternatively be stored in a data store coupled to and accessible by the performance retrieval and incident resolution application.

The performance retrieval and incident resolution application may also obtain incident data describing a context of the alarm that caused the incident report. The context of the alarm may refer to various factors that may have caused the alarm or affected the processing of the alarm, any earlier-generated incident reports that may be associated with the NE(s) that caused the alarm, any rule that may be associated with the alarm, a lack of rule associated with the alarm, a maintenance state of the NE(s) at which the alarm occurred, any software or hardware updates performed anywhere in the system or in the RAN, or any other factor that may be related to the alarm or the NE(s) at which the alarm occurred.

In this way, the incident data describing the context of the alarm may include incident histories of the NE(s) at which the alarm occurred over a predetermined period of time, a record of alarms received from the NE(s) at which the alarm occurred, co-pending alarms active and being processed at the time that the alarm that led to the present incident report occurred, a status of equipment at or near the NE(s) when the alarm occurred, a maintenance history of the NEs, alarm rules or configurations associated with the NEs, etc.

The incident histories may include a history of prior incident reports created for the NEs. The record of alarms may include a history of prior alarms received from the NEs, but not necessarily processed into incident reports. The co-pending alarms may include alarms that were being sent by the NEs to the OSS during the time that the alarm that led to the present incident report occurred, which as mentioned above, may not have been resolved until the present incident report was received. The status of the equipment may include other equipment at or near the NEs that couple to or communicate with the NEs during the alarm. The rules may refer to specific alarm rules created for the NEs, for example, for specific types of alarms that may occur at the NEs (e.g., path failures, cell site unreachable, power failures, etc.).

The performance retrieval and incident resolution application may receive this incident data by querying a data store with the identification data, in which the data store may maintain this contextual data in association with all outages, alarms, and/or incident reports in the communication system. The data store may store the contextual data in association with the identification data of the NEs at which the outage occurred and return the contextual data to the performance retrieval and incident resolution application upon request. The performance retrieval and incident resolution application may otherwise receive the incident data from the NEs, the central monitoring system, the NOC, or another entity in the communication system that may keep track of the foregoing contextual data.

In this way, the embodiments disclosed herein alleviate difficulties for NOC operators to effectively resolve incidents at cell sites, by reducing the likelihood that the NOC operator takes action(s) based on an out-of-date incident, which may have already been resolved at that point in time. The embodiments also allow NOC operators and/or computer systems to verify incident resolution in a timelier manner, which further decreases downtime or other non-productive time surrounding cell site incident detection and resolution. Therefore, the embodiments disclosed herein may also increase network capacity and customer experience by more quickly and accurately resolving incidents at cell sites, which may also decrease consumption of network, power, and computing resources associated with cell site incident detection and resolution. These embodiments are described further below, with reference to the accompanying figures.

Turning now to FIG. 1, a communication system 100 is described. In an embodiment, the communication system 100 comprises a radio access network (RAN) 102, a plurality of operational support systems (OSSs) 104, a network 106, a cell site maintenance tracking system 108, an alarms configuration system 110, an automated alarms handling system 112 that executes a performance retrieval and incident resolution (PRIR) application 114, a network operation center (NOC) dashboard system 116, an incident reporting system (or application) 118, and a data store 120. In an embodiment, communication system 100 may be a telecommunications carrier network comprising the RAN 102.

In an embodiment, the PRIR application 114 functionality may be implemented by multiple separate applications, operating on separate computer systems, respectively. For example, a performance retrieval application may be implemented on a first computer system, while an incident resolution application is implemented on a second computer system. In this example, the performance retrieval application and the incident resolution application are configured to communicate with each other to implement the functionality described herein as attributed to the PRIR application 114.

The RAN 102 comprises a plurality of cell sites and backhaul equipment. In an embodiment, the RAN 102 comprises tens of thousands or even hundreds of thousands of cell sites. The cell sites may comprise electronic equipment and radio equipment including antennas. The cell sites may be associated with towers or buildings on which the antennas may be mounted. The cell sites may comprise a cell site router that couples to a backhaul link from the cell sites to the network 106. The cell sites may provide wireless links to user equipment (e.g., mobile phones, smart phones, personal digital assistants, laptop computers, tablet computers, notebook computers, wearable computers, headset computers) according to a 5G, a long-term evolution (LTE), code division multiple access (CDMA), or a global system for mobile communications (GSM) telecommunication protocol. In an embodiment, the OSSs 104 comprises tens or even hundreds of OSSs. The network 106 comprises one or more public networks, one or more private networks, or a combination thereof. The RAN 102 may from some points of view be considered to be part of the network 106 but is illustrated separately in FIG. 1 to promote improved description of the system 100.

The cell site maintenance tracking system 108 is a system implemented by one or more computers. Computers are discussed further hereinafter. The cell site maintenance tracking system 108 is used to track maintenance activities on network elements (e.g., cell site equipment, routers, gateways, and other network equipment). When a network element (NE) is in maintenance, alarms that may occur on the NE may be suppressed, to avoid unnecessarily opening incident reports related to such alarms that may be generated because of unusual conditions the equipment may undergo pursuant to the maintenance activity. When a maintenance action is completed, maintenance personnel may be expected to check and clear all alarms pending on the subject NE before the end of the time scheduled for the maintenance activity.

The alarm configuration system 110 is a system implemented by one or more computers. The alarm configuration system 110 allows users to define rules and instructions for handling alarms, for example rules for automatic processing of alarms by the automated alarms handling system 112. The alarm configuration system 110 may define rules for when an alarm leads to automatic generation of an incident report, as described herein.

Alarms are flowed up from NEs of the RAN 102 via the OSSs 104 to be stored in the data store 120. The NOC dashboard 116 can access the alarms stored in the data store 120 and provide a list of alarms on a display screen used by NOC personnel. NOC personnel can manually open incident reports on these alarms. In an embodiment, the NOC dashboard 116 provides a system that NOC personnel can use to monitor health of a carrier network (e.g., monitor the RAN 102 and at least portions of the network 106), to monitor alarms, to drill down to get more details on alarms and on NE status, to review incident reports, and to take corrective actions to restore NEs to normal operational status. The NOC dashboard 116 may interact with the data store 120, with the cell site maintenance tracking system 108, the OSSs 104, the RAN 102, and other systems. NOC personnel can use the NOC dashboard 116 to manually create incident reports based on alarms reviewed in a user interface of the NOC dashboard 116.

In an embodiment, the NOC dashboard 116 may include a display that displays a first performance metric (e.g., a time series of data) for a given cell site. As described above, certain data from cell sites may be delayed on the order of 60-90 minutes or more, and thus the NOC dashboard 116 performance metric that is viewable at a given time may actually reflect a status of the cell site from 60-90 minutes in the past, or more. In some embodiments, the PRIR application 114 is configured to supplement the NOC dashboard 116 performance metric based on the performance data that is more up-to-date and queried directly from the OSS 104 associated with the cell site. For example, the NOC dashboard 116 displays a first performance metric time series based on the relatively older data (e.g., 60-90 minutes old, or more), while the PRIR application 114 determines a second performance metric time series based on the performance data received directly from the OSS 104 associated with the cell site, which is more recent than the first performance metric time series. Then, the PRIR application 114 supplements the first performance metric time series (e.g., by combining) with the second performance metric time series, and the NOC dashboard 116 display is configured to display the supplemented performance metric (e.g., the combination of the first performance metric time series and the second performance metric time series).

The incident reporting application (or system) 118 can monitor the alarms stored in the data store 120 and automatically generate incident reports on these alarms based in part on the alarm configurations created and maintained by the alarms configuration system 110. For example, an alarm configuration rule defined by the alarm configuration system 110 may indicate that an incident report is not to be opened related to a specific alarm until the alarm has been active for a predefined period of time, for example for five minutes, for ten minutes, for fifteen minutes, for twenty minutes, for twenty-five minutes, or some other period of time less than two hours. The time criteria for auto generation of incident reports may be useful to avoid opening and tracking incidents that are automatically resolved by other components of the system 100, as described further hereinafter. Incident reports may be referred to in some contexts or by other communication service providers as tickets or trouble tickets.

The PRIR application 114 may operate upon incident reports in a sequence of processes. In an embodiment, the PRIR application 114 may perform automated triage on incident reports that includes automated enrichment of alarms and/or incident reports, automated dispatch to field operations personnel for some incident reports, and automated testing. Automated enrichment may comprise looking-up relevant information from a plurality of disparate sources and attaching this relevant information to the incident report. The looked-up information may comprise local environmental information such as weather reports, rainfall amounts, temperature, wind. The looked-up information may comprise logs of recent maintenance activities at the affected NE.

The automated triage process may involve determining a probable root cause for the incident and adding this to the incident report during the enrichment action. The probable root causes may be categorized as related to electric power, backhaul (e.g., transport), maintenance, or equipment (e.g., RAN hardware related), but within these general categories it is understood there may be a plurality of more precise probable root causes. The automated triage process can assign an incident report to personnel for handling based on its determination of the probable root cause of the incident report.

In an embodiment, the PRIR application 114 may automatically close an incident report when NE status warrants such automated closure. Automated closure may happen because NOC personnel have taken manual corrective action to restore proper function of one or more NEs. Automated closure may happen because the PRIR application 114 determines that the incident report was created pursuant to a maintenance action that extended beyond the scheduled maintenance interval and that the scheduled maintenance interval was later extended, but extended after a related incident report had already been generated. The PRIR application 114 may perform automated remediation of alarm conditions associated with incident reports. For example, cell sites can be reset to restore operation and clear alarmed conditions. For example, cell sites can be locked and unlocked to restore operation and clear alarmed conditions. For example, cell sites may be resynched with GPS. For example, a software or firmware update may be pushed to cell sites.

In an embodiment, the incident reporting application 118 and the PRIR application 114 may operate together to alleviate difficulties for NOC operators to effectively resolve incidents in the communication system 100, as described herein. The incident reporting application 118 may obtain (e.g., automatically generate or receive) an incident report based on an underlying alarm-generating incident. As described above, an alarm may be generated when a cell site is either unreachable or operating below capacity (e.g., below a minimum bandwidth or throughput level), such as when a cell site goes "sleepy". However, the incident report may be delayed relative to the incident onset at the cell site, as described above.

Accordingly, the PRIR application 114 may be configured to receive the incident report (e.g., from the incident reporting application 118) that is based on first data associated with a first cell site of the RAN 102. As described above, by the time the incident report is received by the PRIR application 114, 60-90 minutes or more may have elapsed from the onset of the underlying alarm-generating incident (e.g., the first cell site going "sleepy"), which is referred to as a first time for reference. The cause of this delay may be that the incident report is received via a first communication path, which includes a certain amount of information processing overhead, such as properly collecting alarm data from the first cell site, filtering and/or storing such data from the first cell site, and providing the data from the first cell site in a user-friendly fashion (e.g., in a reporting style that is easily understood by human operators at the NOC 116). The first communication path may also include inherent delay because monitoring of cell sites is not necessarily performed in real-time, but rather in a batch-type fashion, where cell sites only typically report data on relatively coarse intervals, such as once every 15 minutes or the like.

To address the above, the PRIR application 114 is configured to query the first cell site for performance data of the first cell site in response to receiving the incident report. In order to query the cell site for its performance data, the PRIR application 114 may determine an OSS 104 that is associated with the first cell site. For example, a table may be maintained in a data repository (e.g., data store 120) that associates each cell site in a region, or in the communications network, with a particular OSS 104. Then, once the OSS 104 that is associated with the first cell site is determined, the PRIR application 114 establishes a secure direct connection (e.g., using SSH with the OSS 104 in order to query the first cell site for its more up-to-date performance data.

As a result, the PRIR application 114 may receive the up-to-date performance data from the first cell site in a more direct fashion, such as directly from the OSS 104 associated with the first cell site, indicated by dashed line 115. Thus, a second communication path 115 that is independent of the first communication path is provided between the PRIR application 114 and the OSS 104 associated with the first cell site. Accordingly, the received performance data is associated with a second time, which is later than the first time (i.e., the time at which the onset of the underlying alarm-generating incident occurred), and is thus more up-to-date than the first data of the incident report.

When the performance data indicates that the incident is still ongoing (e.g., has not been resolved between the first time and the second time), the PRIR application 114 may also implement a control response at the first cell site responsive to the received performance data. The control response may be automated (e.g., implemented without human interaction), or may be under the control of a NOC dashboard 116 operator, or a combination thereof. The control response may generally take various forms of intervention(s) meant to resolve the incident indicated by the incident report (e.g., the underlying root cause that generated the alarm upon which the incident report is based).

For example, the PRIR application 114 may implement an automated cell site recovery routine as the control response, which may include a number of predetermined steps or actions to take that may result in returning the cell site to a normal performance state. The predetermined steps or actions may be performed in parallel, sequentially, or a combination of certain steps performed in parallel and other steps performed sequentially.

In one example, the control response includes resetting a first subset of NE(s) at the first cell site. Thereafter, the PRIR application 114 receives second performance data from the first cell site (e.g., associated with a third time after the second time) and determines whether the control response is effective, such as whether resetting the first subset of NE(s) has resolved the incident. If the second performance data indicates that the incident is resolved, the PRIR application 114 may clear the associated incident report.

However, if the second performance data indicates that the incident is not resolved, the PRIR application 114 may implement a second, more intrusive control response, such as resetting a second subset of NE(s) at the first cell site, which is larger in scope than the first subset of NE(s). In other words, the initial control response may be less intrusive, in an attempt to resolve the incident with a reduced impact on the first cell site functionality. However, if the initial control response is not successful (e.g., as indicated by the received second performance data), then a subsequent, more intrusive control response is undertaken. The PRIR application 114 may also receive third performance data from the first cell site after resetting the second subset of NE(s) (e.g., associated with a fourth time after the third time) and determines whether the additional control response is effective, such as whether resetting the second subset of NE(s) has resolved the incident. The second and third performance data may be retrieved via the second communication path 115, and thus also represent more up-to-date information regarding the performance of the first cell site. If the third performance data indicates that the incident is resolved, the PRIR application 114 may clear the associated incident report.

In an example in which the PRIR application 114 is implemented in a distributed fashion (e.g., as a performance retrieval application in communication with a separate incident resolution application), the performance retrieval application is configured to receive the incident report, query the first cell site for performance data, and receive such performance data from the first cell site. The incident resolution application is configured to implement the control response at the first cell site based on the received performance data, in order to resolve the incident(s) indicated by the incident report.

Figure 2:
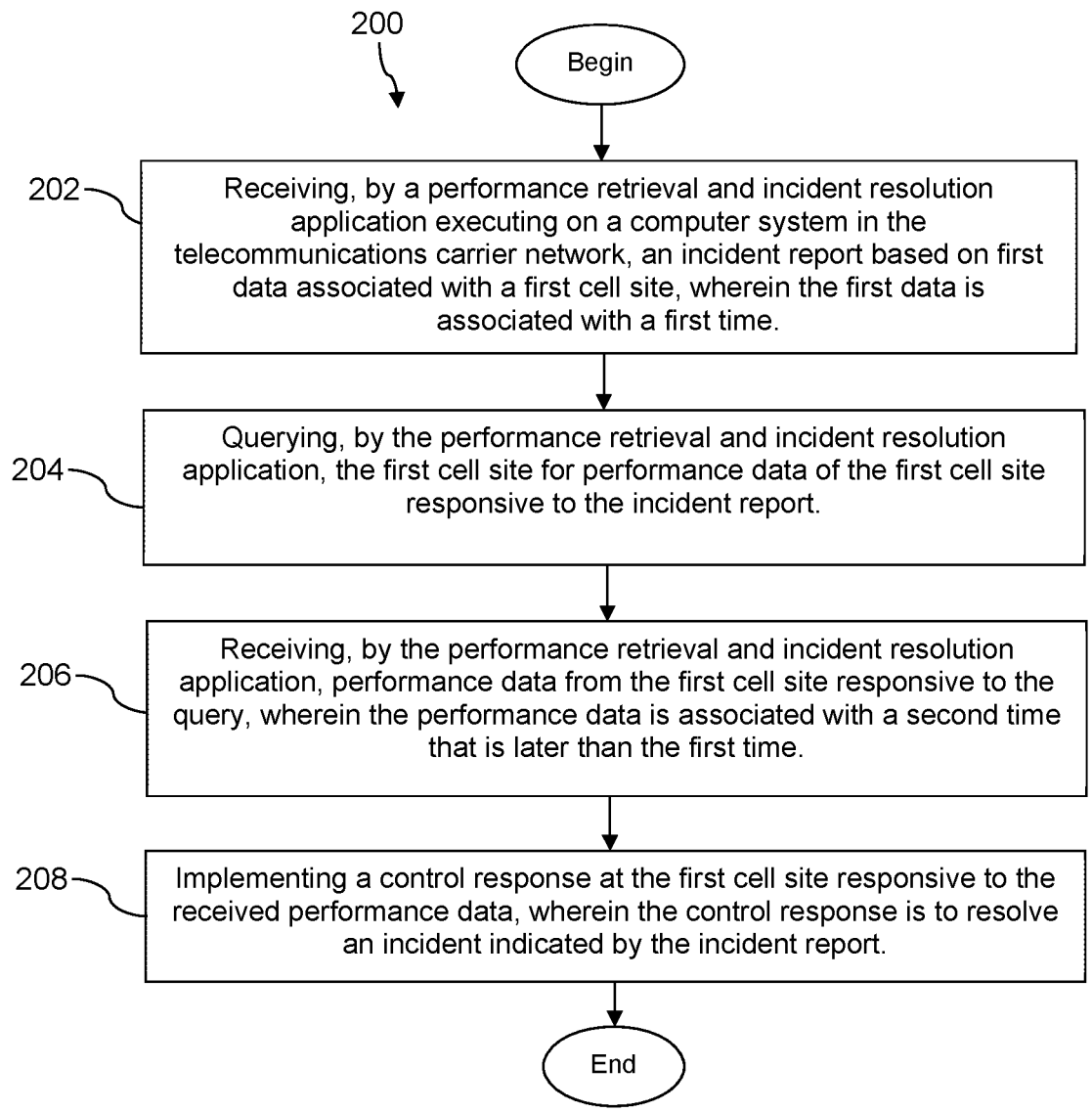
FIG. 2 is a flow chart of a method according to an embodiment of the disclosure.

Turning now to FIG. 2, a method 200 is described. In an embodiment, method 200 may be a method for automated retrieval of performance data and incident resolution based on an incident report in a telecommunications carrier network, such as communication system 100. Method 200 may be performed to detect and resolve incidents at cell sites in the communication system 100, such as cell sites that go "sleepy".

At step 202, method 200 comprises receiving, by a PRIR application 114 executing on a computer system in the telecommunications carrier network (e.g., communication system 100), an incident report based on first data associated with a first cell site. The first data is associated with a first time, which may be 60-90 minutes in the past or more. In other words, the incident report is received in a delayed fashion as described above, in part because the incident report is received via a first communication path that includes a greater amount of information processing overhead.

At step 204, method 200 comprises querying, by the PRIR application 114, the first cell site for performance data of the first cell site responsive to the incident report. At step 206, method 200 comprises receiving, by the PRIR application 114, performance data from the first cell site responsive to the query, where the performance data is associated with a second time that is later than the first time. As described above, the PRIR application 114 may determine an OSS 104 that is associated with the first cell site, and establish a secure direct connection with that OSS 104 in order to receive the performance data more quickly (via second communication path 115), which results in the performance data being more up-to-date than the first data of the incident report. In other words, the second time is later than the first time (i.e., the time at which the onset of the underlying alarm-generating incident occurred), and thus the received performance data is more up-to-date than the first data of the incident report.

At step 208, method 200 comprises implementing a control response at the first cell site responsive to the received performance data, where the control response is to resolve an incident indicated by the incident report. As described above, the control response may include an automated cell site recovery routine, and/or resetting one or more subsets of NE(s) at the cell site.

Figure 3:
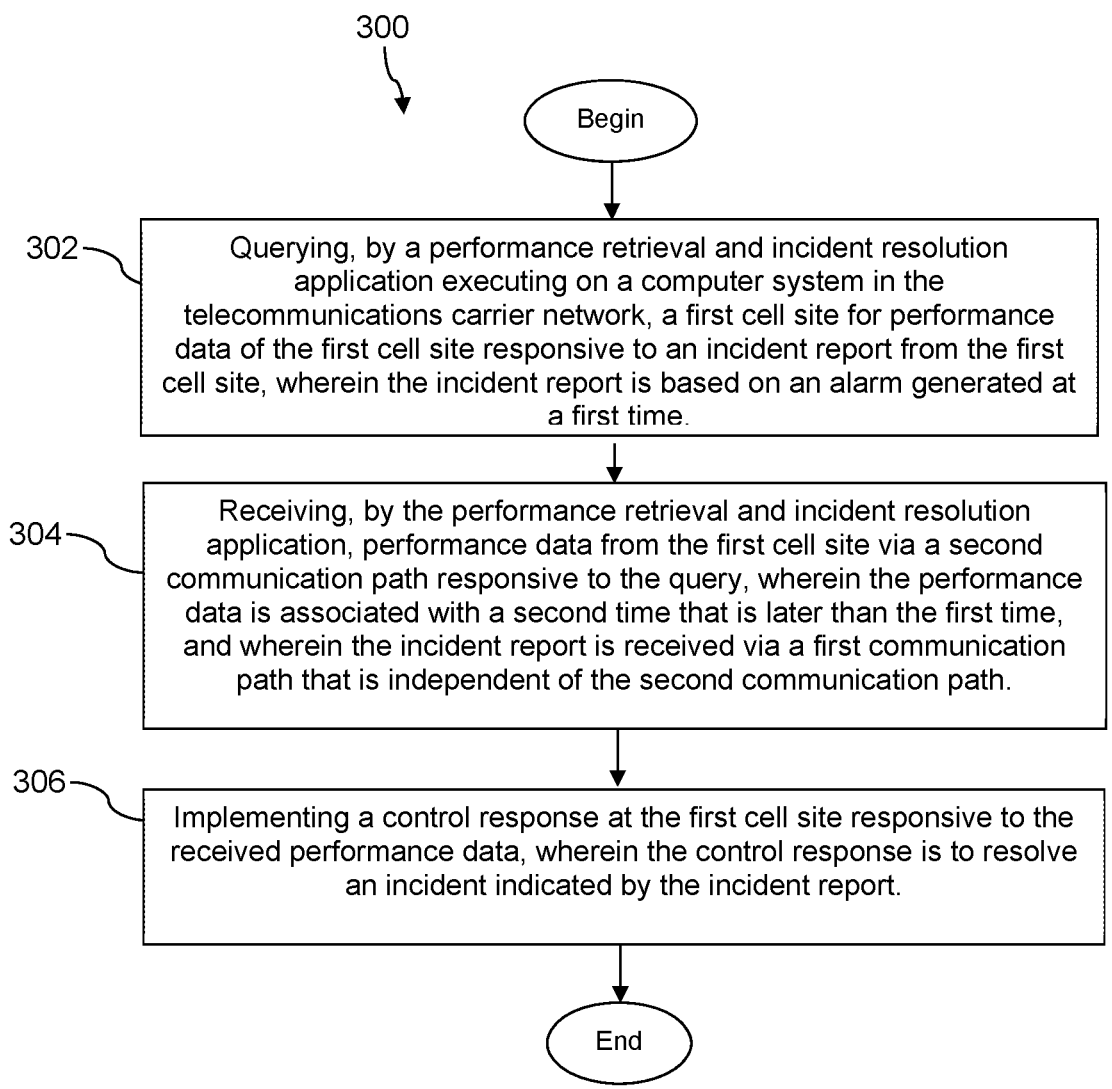
FIG. 3 is a flow chart of another method according to an embodiment of the disclosure.

Turning now to FIG. 3, another method 300 is described. In an embodiment, method 300 may be a method for automated retrieval of performance data and incident resolution based on an incident report in a telecommunications carrier network, such as communication system 100. Method 300 may be performed to detect and resolve incidents at cell sites in the communication system 100, such as cell sites that go "sleepy".

At step 302, method 300 comprises querying, by a PRIR application 114 executing on a computer system in the telecommunications carrier network (e.g., communication system 100), a first cell site for performance data of the first cell site responsive to an incident report from the first cell site. The incident report is based on an alarm generated at a first time, which may be 60-90 minutes in the past or more. In other words, the performance data is queried based on a delayed incident report as described above, in part because the incident report is received via a first communication path that includes a greater amount of information processing overhead.

At step 304, method 300 comprises receiving, by the PRIR application 114, performance data from the first cell site via a second communication path responsive to the query, where the performance data is associated with a second time that is later than the first time. As described above, the PRIR application 114 may determine an OSS 104 that is associated with the first cell site, and establish a secure direct connection with that OSS 104 in order to receive the performance data more quickly (via second communication path 115), which results in the performance data being more up-to-date than the first data of the incident report. In other words, the second time is later than the first time (i.e., the time at which the onset of the underlying alarm-generating incident occurred), and thus the received performance data is more up-to-date than the first data of the incident report.

At step 306, method 300 comprises implementing a control response at the first cell site responsive to the received performance data, where the control response is to resolve an incident indicated by the incident report. As described above, the control response may include an automated cell site recovery routine, and/or resetting one or more subsets of NE(s) at the cell site.

Figure 4:
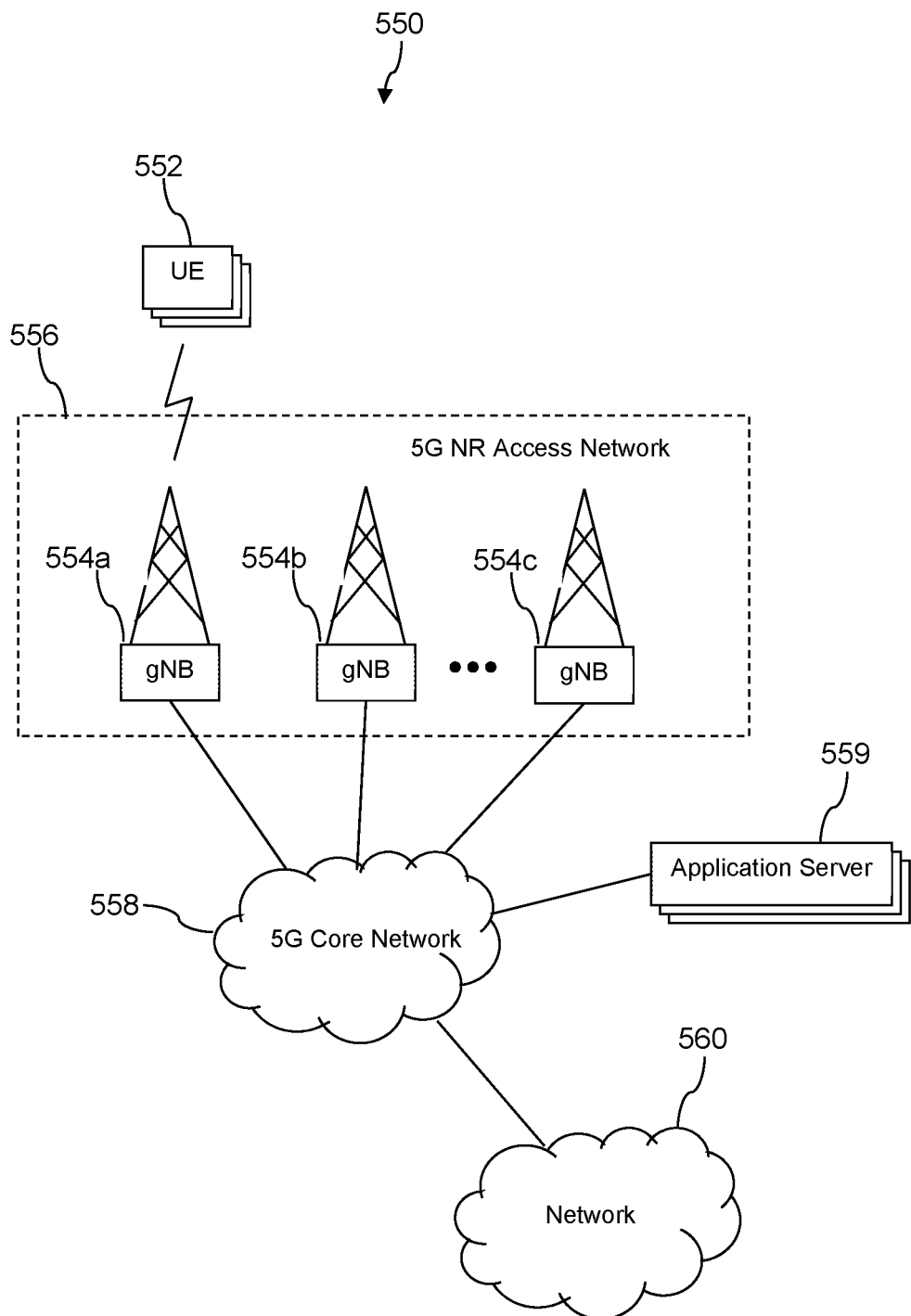
FIG. 4 and FIG. 5 are block diagrams of a 5G network according to an embodiment of the disclosure.

Turning now to FIG. 4, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5:
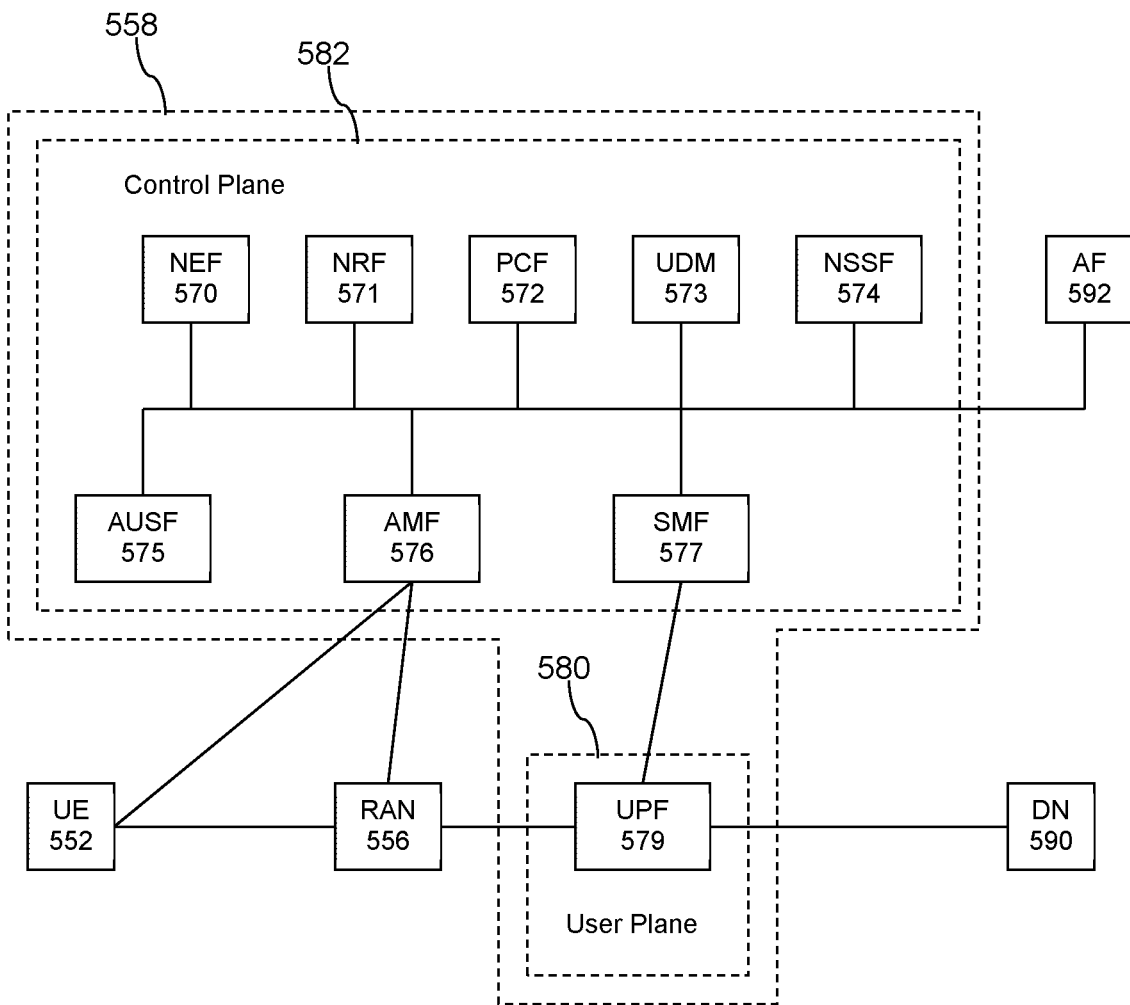

Turning now to FIG. 5, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
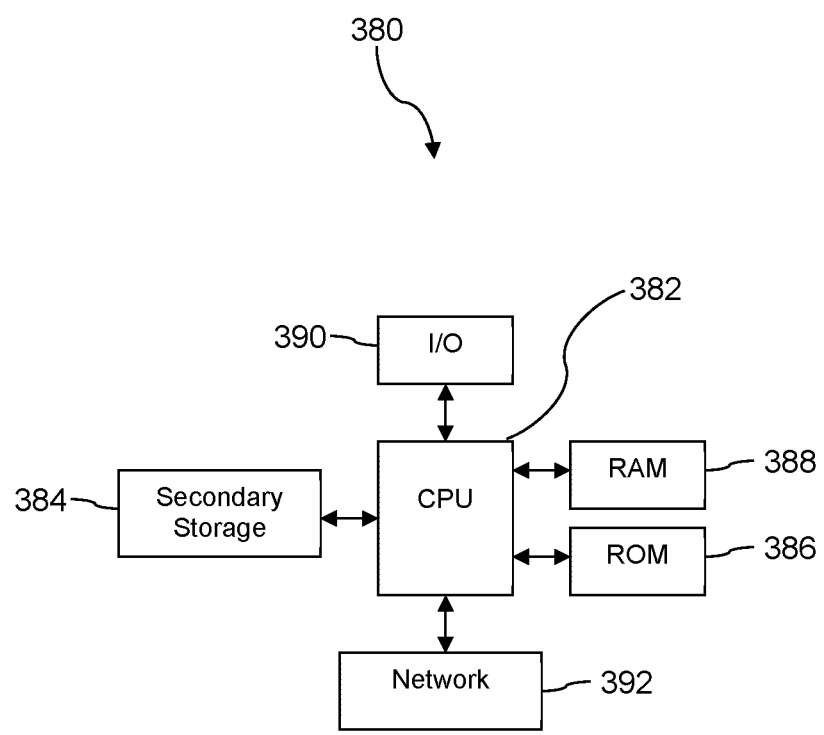
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an overflow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for automated retrieval of performance data and incident resolution based on an incident report in a telecommunications carrier network comprising a radio access network, wherein the incident report is delayed relative to the retrieved performance data, the method comprising:
   receiving, by a performance retrieval and incident resolution application executing on a computer system in the telecommunications carrier network, an incident report based on first data associated with a first cell site, wherein the first data is associated with a first time;
   querying, by the performance retrieval and incident resolution application, the first cell site for performance data of the first cell site responsive to the incident report;
   receiving, by the performance retrieval and incident resolution application, performance data from the first cell site responsive to the query, wherein the performance data is associated with a second time that is later than the first time; and
   implementing a control response at the first cell site responsive to the received performance data, wherein the control response (i) is to resolve an incident indicated by the incident report and (ii) comprises:
      resetting, by the performance retrieval and incident resolution application, a first subset of one or more network elements of the first cell site;
      receiving, by the performance retrieval and incident resolution application, second performance data from the first cell site, wherein the second performance data is associated with a third time that is later than the second time;
      determining, by the performance retrieval and incident resolution application, that the second performance data indicates that the incident of the first cell site is not resolved;
      in response to the second performance data indicating that the incident of the first cell site is not resolved, resetting, by the performance retrieval and incident resolution application, a second subset of one or more network elements of the first cell site, wherein the second subset includes the first subset and at least one additional network element;
      receiving, by the performance retrieval and incident resolution application, third performance data from the first cell site, wherein the third performance data is associated with a fourth time that is later than the third time;
      determining, by the performance retrieval and incident resolution application, whether the third performance data indicates that the incident of the first cell site is resolved; and
      clearing the incident report responsive to the third performance data indicating that that the incident of the first cell site is resolved.

2. The method of claim 1, wherein the incident report indicates that the first cell site is servicing an amount of network traffic less than a predefined threshold at the first time.

3. The method of claim 1, wherein the incident report is received via a first communication path and wherein querying and receiving the performance data of the first cell site is via a second communication path that is independent of the first communication path.

4. The method of claim 3, wherein the performance retrieval and incident resolution application is executed on a network operations center (NOC) computer system, and wherein the second communication path is a direct communication path from the NOC computer system to an operational support system (OSS) associated with the first cell site.

5. The method of claim 4, wherein a display of the NOC computer system displays a first performance metric time series of the first cell site, wherein the first performance metric time series is based on the first data, and wherein the method further comprises:
   determining, by the performance retrieval and incident resolution application, a second performance metric time series of the first cell site, wherein the second performance metric time series is based on the performance data; and
   supplementing, by the performance retrieval and incident resolution application, the display of the first performance metric time series with the second performance metric time series.

6. The method of claim 1, wherein before querying the first cell site, the method further comprises:
   determining an operational support system (OSS) associated with the first cell site; and
   establishing, by the performance retrieval and incident resolution application, a secure direct connection with the OSS to facilitate querying the first cell site.

7. The method of claim 1, wherein the control response comprises an automated cell site recovery routine.

8. A telecommunication network management system for automated retrieval of performance data and incident resolution based on an incident report, implemented in a telecommunications carrier network comprising a radio access network, wherein the incident report is delayed relative to the retrieved performance data, the telecommunication network management system comprising:
   a performance retrieval application executing on a first computer system, wherein the performance retrieval application is configured to:
      receive an incident report based on first data associated with a first cell site, wherein the first data is associated with a first time;
      query the first cell site for performance data of the first cell site responsive to the incident report; and
      receive performance data from the first cell site responsive to the query, wherein the performance data is associated with a second time that is later than the first time; and
   an incident resolution application executing on a second computer system, wherein the incident resolution application is configured to implement a control response at the first cell site responsive to the received performance data, wherein the control response (i) is to resolve an incident indicated by the incident report and (ii) comprises:
      resetting a first subset of one or more network elements of the first cell site;

receiving second performance data from the first cell site, wherein the second performance data is associated with a third time that is later than the second time;

determining that the second performance data indicates that the incident of the first cell site is not resolved;

in response to the second performance data indicating that the incident of the first cell site is not resolved, resetting a second subset of one or more network elements of the first cell site, wherein the second subset includes the first subset and at least one additional network element;

receiving third performance data from the first cell site, wherein the third performance data is associated with a fourth time that is later than the third time;

determining whether the third performance data indicates that the incident of the first cell site is resolved; and clearing the incident report responsive to the third performance data indicating that that the incident of the first cell site is resolved.

9. The telecommunication network management system of claim 8, wherein the incident report indicates that the first cell site is servicing an amount of network traffic less than a predefined threshold at the first time.

10. The telecommunication network management system of claim 8, wherein the performance retrieval application receives the incident report via a first communication path and wherein the performance retrieval application is configured to query and receive the performance data of the first cell site via a second communication path that is independent of the first communication path.

11. The telecommunication network management system of claim 10, wherein the first computer system comprises a network operations center (NOC) computer system, and wherein the second communication path is a direct communication path from the NOC computer system to an operational support system (OSS) associated with the first cell site.

12. The telecommunication network management system of claim 11, wherein a display of the NOC computer system displays a first performance metric time series of the first cell site, wherein the first performance metric time series is based on the first data, and wherein the performance retrieval application is further configured to:

determine a second performance metric time series of the first cell site, wherein the second performance metric time series is based on the performance data; and supplement the display of the first performance metric time series with the second performance metric time series.

13. The telecommunication network management system of claim 8, wherein before querying the first cell site, the performance retrieval application is further configured to:

determine an operational support system (OSS) associated with the first cell site; and establish a secure direct connection with the OSS to facilitate querying the first cell site.

14. The telecommunication network management system of claim 8, wherein the control response comprises an automated cell site recovery routine.

15. The telecommunication network management system of claim 8, wherein the incident resolution application implements the control response by locking the first cell site and subsequently unlocking the first cell site.

16. The telecommunication network management system of claim 15, wherein in response to the second performance data indicating that the incident of the first cell site is not resolved, the incident resolution application is further configured to lock a radio unit or base band unit of the first cell site, reset the radio unit or base band unit of the first cell site, and unlock the radio unit or the base band unit of the first cell site.

17. A method for automated performance retrieval and incident resolution in a telecommunications carrier network comprising a radio access network, comprising:

querying, by a performance retrieval and incident resolution application executing on a computer system in the telecommunications carrier network, a first cell site for performance data of the first cell site responsive to an incident report from the first cell site;

receiving, by the performance retrieval and incident resolution application, performance data from the first cell site via a second communication path responsive to the query, wherein the incident report is received via a first communication path that is independent of the second communication path; and implementing a control response at the first cell site responsive to the received performance data, wherein the control response comprises:

resetting, by the performance retrieval and incident resolution application, a first subset of one or more network elements of the first cell site;

receiving, by the performance retrieval and incident resolution application, second performance data from the first cell site, wherein the second performance data is associated with a third time that is later than the second time;

determining, by the performance retrieval and incident resolution application, that the second performance data indicates that the incident of the first cell site is resolved;

in response to the second performance data indicating that the incident of the first cell site is not resolved, resetting, by the performance retrieval and incident resolution application, a second subset of one or more network elements of the first cell site, wherein the second subset includes the first subset and at least one additional network element;

receiving, by the performance retrieval and incident resolution application, third performance data from the first cell site, wherein the third performance data is associated with a fourth time that is later than the third time;

determining, by the performance retrieval and incident resolution application, whether the third performance data indicates that the incident of the first cell site is resolved; and clearing the incident report responsive to the third performance data indicating that that the incident of the first cell site is resolved.

* * * * *